United States Patent [19]

Tatara et al.

[11] 4,053,429

[45] Oct. 11, 1977

[54] SAFETY-CALCIUM HYPOCHLORITE COMPOSITION

[75] Inventors: Seiji Tatara, Tokyo; Yasuo Morita; Makoto Nishonomiya, both of Nakago; Masashi Kumoda, Johetsu, all of Japan

[73] Assignee: Nippon Soda Company, Limited, Tokyo, Japan

[21] Appl. No.: 701,283

[22] Filed: June 30, 1976

Related U.S. Application Data

[63] Continuation-in-part of Ser. No. 518,064, Oct. 25, 1974, abandoned.

[30] Foreign Application Priority Data

Oct. 27, 1973  Japan .................................. 48-121027

[51] Int. Cl.$^2$ ............................................. C01B 11/06
[52] U.S. Cl. .................................. 252/187 H; 423/474
[58] Field of Search ................... 252/187 H; 423/474

[56] References Cited

U.S. PATENT DOCUMENTS

| | | |
|---|---|---|
| 2,446,869 | 8/1948 | Cunningham ......................... 423/474 |
| 3,544,267 | 12/1970 | Dychdala .......................... 423/474 X |
| 3,645,005 | 2/1972 | Dychdala et al. ............... 423/474 X |
| 3,767,775 | 10/1973 | Tatara et al. ......................... 423/474 |
| 3,872,219 | 3/1975 | Sakowski ............................. 423/474 |
| 3,895,099 | 6/1975 | Sakowski ............................. 423/474 |

*Primary Examiner*—Leland A. Sebastian
*Attorney, Agent, or Firm*—George B. Oujevolk

[57] ABSTRACT

Safety-calcium hypochlorite composition containing 16% by weight to about 22% by weight of water and at least an amount of calcium hypochlorite corresponding to 60% by weight of active chlorine content on a dry basis on the composition, wherein active chlorine content is a number of percentage of twice the weight of chlorine of calcium hypochlorite divided by weight of a mixture.

4 Claims, No Drawings

SAFETY-CALCIUM HYPOCHLORITE COMPOSITION

The application is a continuation-in-part of U.S. patent application Ser. No. 518,064 filed Oct. 25, 1974, now abandoned.

BACKGROUND OF THE INVENTION

This invention relates to an improved calcium hypochlorite composition and more particularly, this invention concerns a safety-calcium hypochlorite composition.

BRIEF DESCRIPTION OF THE PRIOR ART

It is known that calcium hypochlorite is a powerful oxidizing agent and when calcium hypochlorite is mixed with a combustible organic compound and is heated, calcium hypochlorite will burn vigorously, also calcium hypochlorite alone decomposes vigorously generating large amounts of heat and oxygen is a chain reaction.

On the other hand, calcium hypochlorite gradually decomposes and the active chlorine therein sometimes decrease by a few % for a month according to the contents of the composition. So, it is necessary that calcium hypochlorite be kept from vigorous combustion and be rendered stable against decomposition.

Several process are proposed for making calcium hypochlorite safe and 48-3077,4-For example, calcium hypochlorite is made safe by adding about 10-50% of an inactive compound such as sodium chloride, various kinds of salts of boric acid undergoes acid. However, when sodium chloride is employed, more than 40% of sodium chloride is required to obtain sufficient effects.

In patent gazette of Japanese patent publication No. Tokkosho 48-3077, 4-15% of water is added to calcium hypochlorite in order to make it safe. However a calcium hypochlorite product containing 4-15% weight % of water under goes decomposition. Self-propagation of the decomposition occurs to the whole product when the calcium hypochlorite product is mixed with about 2% of machine oil and is lit by adding a drop of glycerine.

OBJECTS OF THE INVENTION

Accordingly, it is the object of this invention to provide a calcium hypochlorite composition safe to the extent that the composition does not decompose by self-propagation even when the composition contains combustible oil.

It is another object of this invention to provide a calcium hypochlorite composition stable to the extent that the composition does not substantially decompose at a room temperature.

Others objects and advantages of this invention will hereafter become apparent.

DETAILED DESCRIPTION

In the invention, calcium hypochlorite composition contains and essentially consists of at least 16 to about 22% of water and an amount of calcium hypochlorite corresponding to at least 60% of active chlorine content on a dry basis on the composition. (Active chlorine content of a mixture is defined as twice the weight of chlorine of the calcium hypochlorite divided by the weight of the total mixture.)

From the point of active chlorine content, water content of 16 to 18% is preferable in the invention.

Thus the invention relates to a mixture of $Ca(ClO)_2$ and $Ca(ClO)_2 \cdot 3H_2O$. The trihydrate is inherent in the calcium hypochlorite composition containing 16-22% water and having an active chlorine content of 60%. Namely, when the active chlorine content is 60% and the content is 16-22%, there is found the relationship $Ca(ClO)_2$: $Ca(ClO)_2 \cdot 3H_2O$: (other) = 17.6:58.4:24.0 through 1.7:80.3:18.0; and when the active chlorine content is 70.0%, $Ca(ClO)_2$ : $Ca(ClO)_2 \cdot 3H_2O$: (others) = 27.6:58.4:14.0 through 11.7:80.3:8.0.

The calcium hypochlorite composition can be produced by various methods. For example, dry calcium hypochlorite product containing more than 60% of active chlorine was wetted by spraying the dry calcium hypochlorite or by moisture absorption. In other methods, the slurry or wet calcium hypochlorite product taken out of a process for production of calcium hypochlorite is dried to meet the required water content. This method is most preferable from the point of yield of active chlorine content from chlorine consumed in the production of calcium hypochlorite because when calcium hypochlorite product is dried to dry powder containing 0 to about 2% of water with hot air, decomposition of calcium hypochlorite occurs and a small percentage of active chlorine content drops.

For more particular examples, 100 parts of calcium hypochlorite composition consisting of 16% of water and a calcium hypochlorite component corresponding to more than 60% of active chlorine on a dry base contains essentially 16 parts of water and dry calcium hypochlorite product containing more than 50.7 parts of calcium hypochlorite component, and 100 parts of calcium hypochlorite composition consisting of 22% of water and calcium hypochlorite product corresponding to more than 60% of active chlorine on a dry base contains essentially 22 parts of water and dry calcium hypochlorite product containing more than 46.5 parts of calcium hypochlorite component. Calcium hypochlorite composition containing more than about 70% of active chlorine can be prepared by drying wet calcium hypochlorite product containing 85% of active chlorine on a dry a base to about 16% of water content of the composition and calcium hypochlorite composition containing about 64 to 65% of active cholrine can be prepared by drying wet calcium hypochlorite product containing 80% of active chlorine on a dry base to 20% of water in the composition.

For convenience of transportation active chlorine content of calcium hypochlorite composition is prepared to be more than 60% more preferably more than 70% of the composition and 100 parts of the composition containing more than 70% of active chlorine is composed of 16 parts of water and more than 70.5 parts of calcium hypochlorite component.

The effect of the invention relating to safety of calcium hypochlorite composition is superior.

When calcium hypochlorite product containing less than 16% of water is mixed with machine oil and is lighted with a match, the product causes decomposition and self-propagation of the decomposition occurs to the whole product. However the calcium hypochlorite composition in this invention does not cause decomposition nor self-propagation even if calcium hypochlorite composition is mixed with machine oil and is lit with a match or by dropping glycerine on the composition.

The composition in the invention does not cause self-propagation even when the composition is lit with self-propagating dry calcium hypochlorite powder, on the other hand a calcium hypochlorite product containing 15% of water causes self-propagation to whole product and calcium hypochlorite composition containing 16% of water causes self-propagation however the self-propagation stops on the way of the composition. Namely, the safety of the calcium hypochlorite increases remarkably at water content of 15 to 16%.

Calcium hypochlorite product containing more than 22% of water loses fluidity and has a tendency to adhere to the container and further water is exuded from the product when the product is compressed to a density of more than 1.9 gr/cc for making tablets.

In the invention, the most effective process is for neutral salts of calcium hypochlorite, produced by two step chlorination of sodium hydroxide by chlorine gas in first chlorination and sodium hydroxide and calcium hydroxide by chlorine gas in second chlorination as shown in Japanese patent publication No. Tokkosho 43–25143.

Calcium hypochlorite composition in the invention is stable in storage and 4 to 6% of active chlorine content drops per year. But it is not a serious defect of the invention because the dry product on the market loses 3 to 5% of active chlorine per year.

It has been considered unnecessary for the calcium hypochlorite product to be so safe that decomposition or combustion does not occur even when calcium hypochlorite product is mixed with combustible organic compound such as machine oil. However, such stability when the consumer who sometimes dumps leftover calcium hypochlorite product with ordinary trash and combustion of the trash occurs.

All quantities described in this specification and the appended claimed as "%" refer to "%" by weight unless expressly stated otherwise.

The following examples illustrate the present invention and the results obtained.

Ignition test with glycerine — (1)

Test Method.

20 gr. of calcium hypochlorite product containing 1 to 15% of water and 2% of machine oil or 20gr. of calcium hypochlorite composition 16 to 22% of water and 2% of machine oil were put in a porcelain crucible. 2 drops (about 0.2 gr.) of glycerine were dropped at the center of crucible, and decomposition of calcium hypochlorite by exothermic reaction of glycerine and calcium hypochlorite and self-propagation of the decomposition was observed.

The results are listed in table 1.

Preparation of samples

Dry calcium hypochlorite powder having 0.1 to 3.0 mm of granule size and containing 79% of active chlorine were added to water and sodium chloride to make 65% of active chlorine content. Further 2% of machine oil was added and mixed for 5 minutes, and promptly after mixing, samples were used for the test.

Table 1

|  | TEST NO. | water content (%) | active chlorine content (%) | observation of 1 reaction of glycerine and calcium hypochlorite, 2 decomposition reaction of calcium hypochlorite and 3 self-propagation of decomposition. |
|---|---|---|---|---|
| Calcium hypochlorite composition | 1 | 22 | 62 | 1 For 7~25 seconds decomposition occured at only a spot where glycerine dropped. 2 Flames was not observed. 3 Self-propagation was not observed. |
|  | 2 | 20 | 62 | 1 For 15~45 seconds decomposition occured at only a spot where glycerin dropped. 2 " 3 " |
|  | 3 | 18 | 65 | 1 For 12~20 seconds decomposition occured at only a spot where glycerine dropped. 2 " 3 " |
|  | 4 | 17 | 65 | 1 For 25 seconds decomposition occured at only a spot where glycerine dropped. 2 " 3 " |
|  | 5 | 16 | 65 | 1 For 75~105 seconds decomposition occured at only a spot where glycerine dropped. 2 " 3 " |
| calcium hypochlorite product (comparatives) | 6 | 15 | 65 | 1 For 5 seconds decomposition occured 2 Flames was observed. 3 Self-propagation was transmitted to whole sample for 2~3 minutes. |
|  | 7 | 10 | 65 | 1 For 25 seconds decompositions occured with flames. 3 Self-propagation was transmitted to whole sample for 50~40 seconds. |
|  | 8 | 5 | 65 | 1 " 3 Self-propagation was transmitted to whole sample for 15~22 seconds. |
|  | 9 | 1 | 65 | In a moment combustion occured with flames and a loud noise. | is really necessry in the light of starter of final usage

Table

|  | TEST NO. | water content (%) | active chlorine content | observation |
|---|---|---|---|---|
| calcium hypochlorite composition | 10 | 22 | 62 | 1 Self-propagation was not transmitted beyond the border to sample 2 Black smoke was not generated. |
|  | 11 | 20 | 62 | 1 " 2 " |
|  | 12 | 18 | 65 | 1 Self-propagation was not transmitted beyond the border, |

Table-continued

| TEST NO. | water content (%) | active chlorine content | observation |
|---|---|---|---|
| | | | 2 for 3~5 minutes black smoke was generated. |
| 13 | 17 | 65 | 1 Self-propagation was transmitted as far as about 1cm inside of the sample from the border |
| | | | 2 For 10 seconds black smoke was generated. |
| 14 | 16 | 65 | 1 Self-propagation was transmitted as far as 5.5~6.0 cm inside of sample from the border but Self-propagation stopped on the way rate of self-propagation was 1.0cm/1min. |
| | | | 2 For 5 min. 30 second~5 min. 45 second black smoke generated. |
| calcium hypochlorite product (comparatives) 15 | 15 | 65 | 1 Self-propagation was transmitted to the whole sample beyond the border rate of self-propagation was 1.6cm/min. |
| | | | 2 For 18 min. black smoke generated. Flames were not observed. |
| 16 | 10 | 65 | 1 Self-propagation was transmitted to the whole sample beyond the border. Rate of self-propagation was 3.1cm/min. FLames were not observed. |
| 17 | 5 | 65 | 1 Self-propagation was transmitted to the whole sample beyond the border. Rate of self-propagation was 24cm/min. |
| 18 | 1 | 65 | 1 Self-propagation was transmitted to the whole sample explosively. Large flame occured. |

Ignition test with dry calcium hypochlorite — (2)

Test method

Iron plate having 10 cm of width and 55 cm of length was folded twice at an angle of 90° and a V-style rain pipe was produced. 67 gr. of dry calcium hypochlorite containing 1% water was first set at a length of 20 cm in the bottom of the rain pipe which was placed horizontally and 100 gr. of samples of calcium hypochlorite compositon or product were then set at a length of 30 cm in the bottom of the rain pipe so as to come in contact with dry calcium hypochlorite and the sample.

One end of the dry calcium hypochlorite in the rain pipe was lit with a match and the dry calcium hypochlorite was made to self-propagate. It was observed that the self-propagation was transmitted beyond the border of the dry calcium hypochlorite and the sample.

The results are listed in Table 2.

Preparation of samples.

Samples containing 2% of machine oil and 16 to 22% of water were prepaed as stated in ignition test (1).

Comparative Examples

Eight calcium hypochlorite compositions containing up to 15% moisture are prepared in accordance with the Dychdala's patent specifications U.S. Pat. No. 3,544,267 and U.S. Pat. No. 3,645,005.

1. The method of preparation of the calcium hypochlorite composition (I – IV). (in accordance with U.S. Pat. No. 3,544,267)

Lime in aqueous slurry was chlorinated to produce a solution of calcium hypochlorite. The liquor was clarified to remove the lime impurities and then treated with NaCl salt to precipitate crystals of neutral calcium hypochlorite dihydrate $[Ca(ClO)_2 \cdot 2H_2O]$. The crystals of the neutral calcium hypochlorite dihydrate was separated from the aqueous motor liquors by centrifugation to provide a wet cake of the composition containing about 35% by weight of water. The wet cake was dried in air driers at about 190° F. to produce neutral, substantially anhydrous calcium hypochlorite product $[Ca(ClO)_2]$ which contains less than 1% by weight of water.

Secondarily, a measured amount of water was uniformly added to the substantially dry, dusty calcium hypochlorite product prepared as described above so as to provide a water content therein of from about 4 to about 15% by weight. Namely, hydrated calcium hypochlorite compositions (I – IV) was prepared by treating portions of the aforedescribed, substantially dry particulate calcium hypochlorite with varying amounts of a fine spray of water while mixing. Specimens I to IV were thus prepared having the following water contents in % by weight, respectively 4%, 8%, 12%, 15%.

2. The method of preparation of the calcium hypochlorite composition (V – VIII). (in accordance with U.S. Pat. No. 3,645,005)

By performing the same process in above item (1), a wet cake of the calcium hypochlorite composition containing about 35% by weight of water was prepared. This moist product was then passed through the drying zone of an air dryer (continuous belt type) and withdrawn from the dryer when the water content of the calcium hypochlorite composition was within the range of 6 to 15% (based on total weight). Specimens V to VIII were thus prepared having the following water contents in % by weight, respectively 6%, 9%, 12%, 15%.

3. The method of preparation of the calcium hypochlorite composition (IX – XII) containing 16 – 22 weight of water (in accordance with our invention)

By performing the same process in the Example I of Japanese patent publicaation No. Tokko-sho 43-25143 (corresponding to U.S. Pat. No. 3,572,989), calcium hypochlorite composition comprising neutral anhydrous calcium hypochlorite $[Ca(ClO)_2]$ and neutral calcium hypochlorite trihydrate $[Ca(ClO)_2 \cdot 3H_2O]$ was prepared.

Namely, wet calcium hypochlorite product was prepared by two step chlorination of sodium hydroxide by chlorine gas in first chlorination and sodium hydroxide and calcium hydroxide by chlorine gas in second chlorination. Secondary this wet calcium hypochlorite product is dried to meet to required water content. Specimens IX to XII were thus prepared having the following water contents in % by weight, respectively 16%, 18%, 20%, and 22%. The calcium hypochlorite compositions IX to XII were identified the mixture of $Ca(ClO)_2$ and $Ca(ClO)_2 \cdot 3H_2O$ by X-ray diffractiometry.

4. Ignition test with glycerine

Preparation of samples : Calcium hypochlorite composition were added sodium chloride to meet to 65% of active chlorine content. Further 2% of machine oil was added and mixed for 5 minutes, and promptly after mixing, samples were used for the test.

Test Method: The mixture of 20 gr. of calcium hypochlorite composition and 2% of machine oil were put in a porcelain crucible. 2 drops (about 0.2 gr.) of glycerine were dropped at the center of crucible, and decomposition of calcium hypochlorite by exothermic reaction of glycerine and calcium hypochlorite and self-propagation of the decomposition were observed.

The results were listed in table 1.

Test Method:

Iron plate having 10 cm of width and 55 cm of length was folded twice at an angle of 90° C and V-style rain pipe was produced. 67 gr. of dry calcium hypochlorite containing 1% of water was first set at a length of 20 cm from a tip of the rain pipe which was placed horizontally and 100 gr. of samples of calcium hypochlorite composition was then set at a length of 30 cm from the after tip of the rain pipe in a state to come in contact with dry calcium hypochlorite and the sample.

Table 1

| Calcium hypochlorite composition | | Water Content (%) | Active Chlorine content (%) | Observation of 1 reaction of glycerine and calcium hypochlorite, 2 decomposition reaction of calcium hypochlorite and 3 self-propagation of decomposition |
|---|---|---|---|---|
| in accordance with USP 3,544,267 | I | 4 | 65 | 1 For 20 seconds decomposition occured with large flames. 3 Self-propagation was transmitted to whole sample for 10 seconds. |
| | II | 8 | 65 | 1 For 25 seconds decomposition occured with small flames. 3 Self-propagation was transmitted to whole sample for 40 seconds. |
| | III | 12 | 65 | 1 For 25 seconds decomposition occured with brokenly small flames 3 Self-propagation was transmitted to whole sample for 80 seconds. |
| | IV | 15 | 65 | 1 For 30 seconds decomposition occured with blokenly small flames 3 Self-propagation was transmitted to whole sample for 150 seconds. |
| | V | 6 | 65 | 1 For 25 seconds decomposition occured with flames. 3 Self-propagation was transmitted to whole sample for 30 seconds. |
| in accordance with USP 3,645,005 | VI | 9 | 65 | 1 For 25 seconds decomposition occured with small flames. 3 Self-propagation was transmitted to whole sample for 45 seconds. |
| | VII | 12 | 65 | 1 For 25 seconds decomposition occured with brokenly small flames 3 Self-propagation was transmitted to whole sample for 85 seconds. |
| | VIII | 15 | 65 | 1 For 30 seconds decomposition occured with blokenly small flames 3 Self-propagation was transmitted to whole sample for 170 seconds. |
| in accordance with our invention | IX | 16 | 65 | 1 For 90 seconds decomposition occured at only a spot where glycerine dropped. 2 Flames was not observed. 3 Self-propagation was not observed |
| | X | 18 | 65 | 1 For 20 seconds decomposition occured at only a spot where glycerin dropped. 2 " 3 " |
| | XI | 20 | 65 | 1 For 15 seconds decomposition occured at only a spot where glycerine dropped. 2 " 3 " |
| | XII | 22 | 65 | 1 For 10 seconds decomposition occured at only a spot where glycerine dropped. 2 " 3 " |

5. Ignition test with dry calcium hypochlorite
Preparation of samples:
Samples containing 2% of machine oil were prepared as stated in above item (4).

One end of dry calcium hypochlorite in the rain pipe was lighted with a match and the dry calcium hypochlorite was made to self-propagated. It is observed whether the self-propagation was transmitted beyond the border of dry calcium hypochlorite and sample.

The results were list in table 2.

Table 2

| Calcium hypochlorite composition | Water content | Active Chlorine content | 1 Observation 2 Rate of self-propagation |
|---|---|---|---|
| in accordance | | | 1 Self-propagation was transmitted |

Table 2-continued

| Calcium hypochlorite composition | | Water content | Active Chlorine content | 1 Observation / 2 Rate of self-propagation |
|---|---|---|---|---|
| with U.S. PAT. No. 3,544,267 | I | 4 | 65 | 1 to whole sample with flames. <br> 2 40 cm/min. |
| | II | 8 | 65 | 1 Self-propagation was transmitted to whole sample <br> 2 10 cm/min. |
| | III | 12 | 65 | 1 " <br> 2 2.8 cm/min. |
| | IV | 15 | 65 | 1 Self-propagation was transmitted to whole sample with black smoke <br> 2 1.6 cm/min. |
| in accordance with U.S. PAT. No. 3,645,005 | V | 6 | 65 | 1 Self-propagation was transmitted to whole sample with small flames. <br> 2 15 cm/min. |
| | VI | 9 | 65 | 1 Self-propagation was transmitted to whole sample. <br> 2 6 cm/min. |
| | VII | 12 | 65 | 1 " <br> 2 2.5 cm/min. |
| | VIII | 15 | 65 | 1 Self-propagation was transmitted to whole sample with black smoke <br> 2 1.4 cm/min. |
| in accordance with our invention | IX | 16 | 65 | 1 Self-propagation was transmitted as far as 6 cm inside of sample from the border, but stopped on the way. <br> 2 1.0 cm/min. |
| | X | 18 | 65 | 1 Self-propagation was not transmitted beyond the border to sample. |
| | XI | 20 | 62 | 1 " |
| | XII | 22 | 62 | 1 " |

We claim:

1. Safety-calcium hypochlorite composition which comprises a mixture of neutral anhydrous calcium hypochlorite having a formula $Ca(ClO)_2$ and neutral calcium hypochlorite trihydrate, having a formula $Ca(ClO)_2 \cdot 3H_2O$ said mixture containing 16% by weight to about 22% by weight of water and at least an amount of calcium hypochlorite corresponding to 60% by weight of the active chlorine content of a dry basis of the composition, wherein the active chlorine content is a number of percentage of twice the weight of chlorine of calcium hypochlorite divided by the weight of a mixture.

2. Safety-calcium hypochlorite composition which comprises a mixture of neutral anhydrous calcium hypochlorite having a formula $Ca(ClO)_2$ and neutral calcium hypochlorite trihydrate, having a formula $Ca(ClO)_2 \cdot 3H_2O$ said mixture containing 16% by weight to about 18% by weight of water and at least an amount of calcium hypochlorite corresponding to 60% by weight of active chlorine content on a dry basis of the composition, wherein the active chlorine content is a number of percentage of twice the weight of chlorine of calcium hypochlorite divided by the weight of a mixture.

3. A process for the preparation of a neutral anhydrous calcium composition having the formula $Ca(ClO)_2$ and a neutral calcium hypochlorite trihydrate having the formula $Ca(ClO)_2 \cdot 3H_2O$ that is resistant to self-propagating decomposition containing 16% by weight to about 22% by weight of water and at least an amount of calcium hypochlorite corresponding to 60% by weight of active chlorine content on a dry basis based on the weight of the composition, said active chlorine content being twice the weight of the chlorine of the calcium hypochlorite divided by the weight of the dry mixture and expressed as percentage said process comprising drying wet calcium hypochlorite produced by a two step chlorination, sodium hydroxide being chlorinated with chlorine gas in a first chlorination step and sodium hydroxide and calcium hydroxide being chlorinated in a second chlorination step, to meet the water content thereof in the above mentioned range.

4. The process according to claim 3, wherein the water content of the partially dried composition is from 18 to 20% by weight.

* * * * *